Patented Nov. 3, 1953

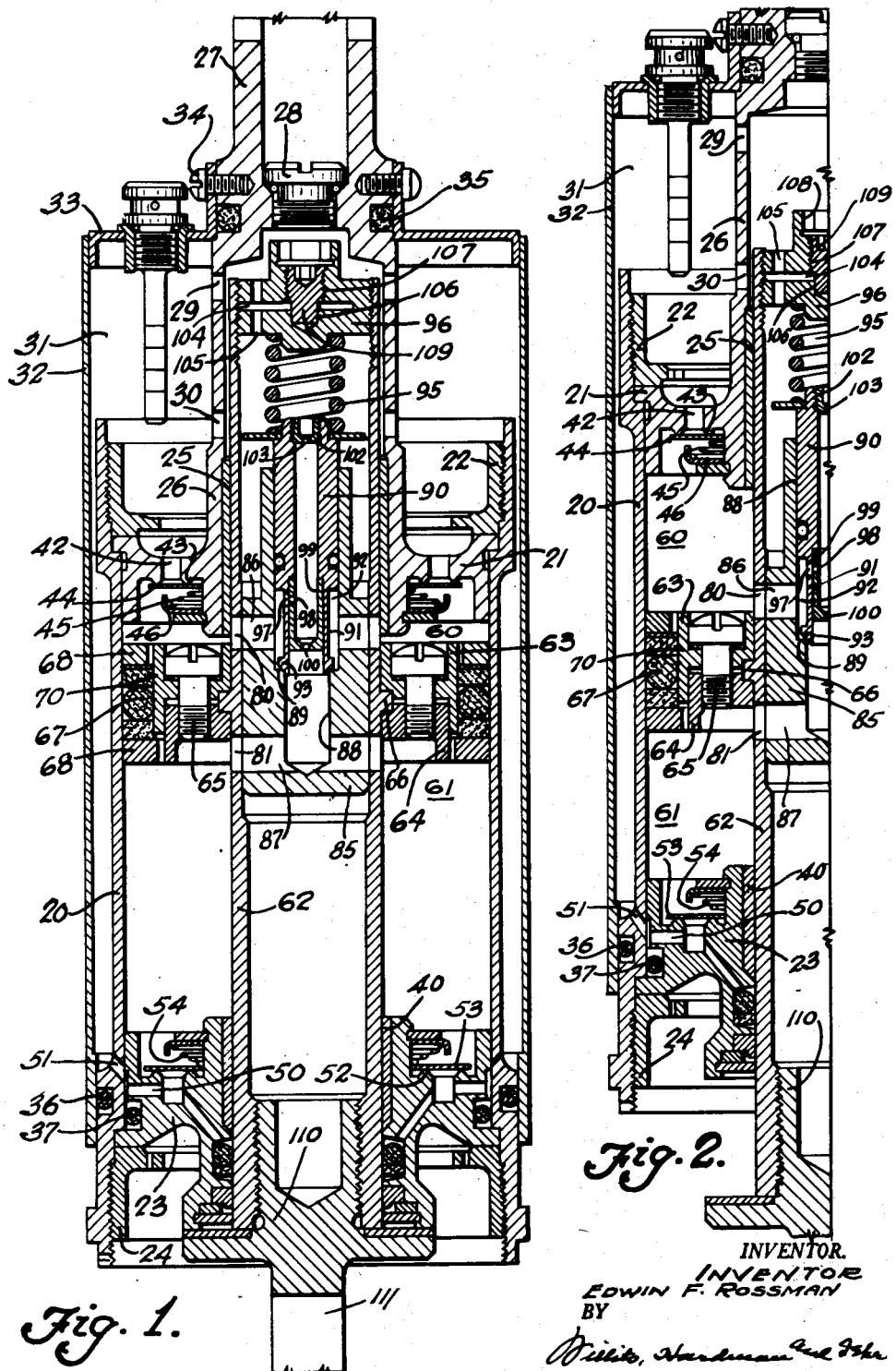

2,657,770

UNITED STATES PATENT OFFICE 2,657,770

SHOCK ABSORBER

Edwin F. Rossman, Dayton, Ohio, assignor to General Motors Corporation, Detroit, Mich., a corporation of Delaware Application August 27, 1951, Serial No. 243,816

10 Claims. (Cl. 188—88)

This invention relates to an improved hydraulic shock absorber.

It is among the objects of the present invention to provide an hydraulic shock absorber of the direct acting type, compact in design, sturdy and of minimum weight so as to be adaptable for installation in airplanes, helicopters, or other aeronautical vehicles in which lightness and strength are important factors.

Further objects and advantages of the present invention will be apparent from the following description, reference being had to the accompanying drawings, wherein a preferred embodiment of the present invention is clearly shown.

In the drawing:

Fig. 1 is a longitudinal, sectional view, substantially double size, of a direct acting hydraulic shock absorber particularly adaptable for use in aeronautical vehicles.

Fig. 2 is a half section, similar to Fig. 1, showing the relatively movable portions of the shock absorber in other operating positions.

Referring to the drawing, the numeral 20 designates the cylinder of the shock absorber, opposite inner ends of which are provided with interior screw threads. Each end of the cylinder 20 has a head member secured within it, the one head member being designated by the numeral 21 and secured in the cylinder by the clamping collar 22, threadedly received by the cylinder, the other head member, at what may be termed the lower end of the cylinder, being designated by the numeral 23 secured within the cylinder 20 by the collar 24 threaded in this end of the cylinder.

The head member 21, hereinafter referred to as the upper cylinder head, has a central opening in which a bearing sleeve 25 is provided for purposes to be described. A cylindrical extension 26 is formed on the upper head 21, this cylindrical extension extending outwardly from the cylinder 20 and at its extreme outer end providing a portion 27 which forms one mounting element for the shock absorber by means of which the shock absorber is attached to one of the relatively movable members whose movement it is adapted to control. The tubular extension 26 is closed at its outer end by a screw plug 28 which is adapted to be removed to render available certain interior elements within the extension 26 for adjustment purposes as will later be described. Spaced openings 29 and 30 are provided in the annular wall of the cylindrical extension 26 in order to provide communication between the reservoir 31 and the interior of the tubular extension 26. This reservoir 31 is formed by an outer tube 32, greater in inside diameter than the outside diameter of the cylinder 20, to form an annular chamber around the cylinder which is part of the reservoir 31, this tube being secured to a disc-like structure 33 which is attached to the tubular extension 26 by means of screws 34, a resilient or compressible packing gland 35 being provided between member 33 and the cylindrical extension 26 to prevent fluid leaks at this point. The other end of the reservoir tube 32 is secured to the lower end of the cylinder 20 in any suitable manner, having a packing ring 36 provided therebetween to prevent fluid leaks at this region. A similar packing ring 37 is located between the head member 23 and the cylinder in order to prevent fluid leaks between the cylinder head 23 and the cylinder.

The lower head member has a central opening of similar diameter and coaxial with the central opening in the head member 26, this central opening in head member 23 also being provided with a bearing sleeve 40.

Both head members are provided with means forming communication between the reservoir 31 and the interior of the cylinder. Head member 21 has a series of openings 42 providing this communication. The inner wall of the head member at which opening 42 terminates has an annular ridge 43 surrounding the opening providing a seat upon which the valve 44 is yieldably urged by a spring 45 interposed between said valve and an abutment ring 46 resting upon a collar secured to the head member 26. As illustrated in Fig. 1, this valve 44 prevents any fluid from passing from the cylinder chamber to the reservoir but on the contrary will, when necessary, be moved to establish a replenishing fluid flow from the reservoir through passages 42 into the interior of the cylinder. Likewise head 23 has a series of passages 50 in communication with the reservoir through side openings 51, the head member 23 providing an annular valve seat 52 around each opening engageable by the ring disc valve 53 under the influence of a spring 54 which is interposed between the valve 53 and a rigid collar secured to the head member 23. This valve 53, like valve 44, will prevent any fluid from passing from the cylinder to the reservoir but on the contrary will open and permit a fluid flow from the reservoir through the passage 51 and the passage 50 into the cylinder if fluid replenishment is necessary within said cylinder.

An imperforate piston reciprocative within the cylinder divides the cylinder into two working chambers 60 and 61, the former being termed the upper chamber and the latter the lower working chamber of the shock absorber. This imperforate piston may be formed integral with a hollow piston rod 62 or, as shown in the present drawing, the piston may be an assembly of the parts secured to the hollow rod 62 so as to be movable thereby. In the present drawing, the imperforate piston is shown as an assembly of two interfitting members 63 and 64 held together by clamping screws or studs 65. Annular grooves in the piston members 63 and 64 cooperate to form a single groove which encompasses and clasps an outwardly extending annular flange 66 on the tubular rod 62 whereby when said piston portions 63 and 64 are clamped together in position on the rod by screws or studs 65 will immovably secure the piston on the hollow rod. Any suitable packing ring 67 is clamped between abutment rings 68 between the two piston portions 63 and 64 to provide a substantially leakproof rubbing contact by the piston upon the interior wall of the cylinder 20. In case the imperforate piston designated for purposes of description as a whole by the numeral 70 is a solid block secured to or formed integral with the hollow piston rod 62 any suitable piston rings, if required, may be provided in the outer annular wall of the piston.

Compactness and minimum weight are obtained by providing the fluid flow control mechanism within the hollow piston rod 62, said mechanism regulating predeterminately the transfer of fluid between the cylinder chambers 60 and 61 as the piston is reciprocated within the cylinder. Rod 62 has openings 80 in its side wall adjacent the upper end of the piston 70 so as to provide communication between the cylinder chamber 60 above the piston and the interior of the hollow rod 62. Similar openings 81 are provided in the annular wall of the hollow piston rod 62 forming communications between the lower cylinder chamber 61 and the interior of the hollow rod 62. A plug 85 is immovably secured within the hollow piston rod 62 in any suitable manner. This plug has radial passages 86 aligning and communicating with the openings 80 in the hollow rod 62 and similar radial passages 87 aligning and communicating with the openings 81 in said rod. Plug 85 has a central recess 88 extending from the upper end surface of the plug and terminating in radial passage 87 so as to communicate therewith. It will, of course, be understood that the central passages 88 in plug 85, to reach the passage 87, also communicates with the radial passage 86, so that these radial passages 86 and 87 in the plug with the aid of the openings 80 and 81, respectively, in the hollow rod, form communication between the respective cylinder chambers and the central passage 88 in plug 85. At a point between the radial passages 86 and 87, the diametrical side of the recess 88 is reduced, thereby providing an annular shoulder 89 within the said recess forming a valve seat therein. A tubular valve 90 is slidably supported within the recess 88 of the plug 85, the valve 90 having a reduced diameter portion 91 adjacent its inner end which forms the annular chamber 92 within the plug 85. The reduced diameter portion 91 of valve 90 has an outwardly extending annular flange 93 adjacent its end, said flange providing the portion of the valve 90 which engages the valve seat 89 under the influence of a coil spring 95 interposed between an abutment collar on the valve 90 and a head member 96 threadedly received at the upper end of the hollow rod 62. Annular wall of the smaller valve portion 91 of valve 90 has an opening 97 therein which communicates with an orifice 98 provided in the cup-shaped plug 99 immovably secured within the smaller diameter valve portion 91. The end wall of the cup-shaped element 99, secured within the valve portion 91, has an orifice 100 similar to or of predetermined size relative to the orifice 98. These orifices 100 and 98, with the assistance of the opening 97 in the valve portion 91, provide a constant communication between the cylinder chambers 60 and 61 while said valve portion 93 engages the valve seat 89 and therefore initially restricts the transfer of fluid in either direction between said cylinder chambers before the valve 90 is moved by fluid pressure. The hollow valve 90 has a screw plug 102 threadedly received at its upper end, this screw plug providing an orifice 103 which forms a restricted communication between the interior of the valve 90 and the space within the hollow piston rod 62 between the valve 90 and the end closure member 96 for said rod.

The end closure member 96 at the upper end of the hollow rod 62 has a through passage 105 connecting the interior of the hollow rod 62 with the interior of the tubular extension 26 which, in turn, is in communication with the reservoir 31 through the opening 29 in said tubular extension. This closure member 96 has a transverse slit 104 which forms two relatively moving parts in said closure member. The outer upper end of the closure member has a central recess, the inner portion of which is of one diameter as at 106, the inner intermediate portion being threaded as at portion 107 and the outer portion thereof being shaped to have flat sides 108, as for instance, a square or rectangular recess into which a wrench may be inserted for the purpose of turning the closure member 96 which, as has been described, is threadedly received by the hollow rod 62. The threaded interior of the recess in the closure member 96 receives a plug 109 having a wrenching-receiving recess at its outer end and a pilot end portion fitting within the portion 106 in the recess of the head member 96. When the plug 109 is turned into the closure end member 96 and its pilot portion engages the bottom of the recess therein, the two portions of the closure member 96, provided by the transverse slit 104, are biased and thus rigidly held so that the closure member 96 is immovably secured to the tubular rod 62. Closure member 96 forms an abutment for the one end of the spring 95, whose other end engages the valve 90 and yieldably urges it so that the portion 93 thereof is yieldably maintained upon the seat 89. If the tension of the spring 95 is to be adjusted, plug 109 is screwed out of the end closure member 96 to release the tension on the split portion of the member, thereby permitting the insertion of a tool in the recessed end 108 of said closure member 96 for purposes of turning it relatively to the rod 62 and thereby obtaining the desired adjustment after which the plug 109 is again operated to tension the closure member 96 in order to lock it into adjusted position in the hollow rod 62. The recessed portion 108 of the end closure member 96 is rendered accessible by the removal of plug 28 from the cylinder closure head 26.

The lower end of the hollow piston rod 62 is completely closed and sealed by a plug 110 threaded into said hollow rod, said plug providing the lower mounting ring 111 by means of which, this portion of the device may be attached to the other member whose movement the shock absorber is adapted to control.

Fig. 1 shows the shock absorber in the completed or contracted position while Fig. 2 shows the shock absorber in the intermediate or partially expanded position. When separating movement of the two relatively movable members, between which the shock absorber is attached, occurs, the portion of the shock absorber comprising the cylinder closure member 21 and its tubular extension 26, together with the cylinder 20, reservoir tube 32 and the lower cylinder closure member 23, will be moved and thus member 23 will approach the piston 70, thereby reducing the cylinder chamber 61 and exerting a pressure upon the fluid therein while the fluid chamber 60 will be enlarged. As pressure is exerted upon the fluid within the chamber 61, it will be forced through opening 81 into hollow rod 62, radial passage 87, in the plug 85, into the recess 88 of said plug, against the valve 90, the initial fluid flow being restricted by passing through the orifice 100 and communicating orifice 98, opening 97 in valve 90, into the annular space chamber 92, thence through radial passage 86, in plug 85, opening 80 in tubular rod 62, into the now enlarging cylinder space or chamber 60. The restriction to the transfer of fluid from chamber 61 to chamber 60 by the orifices 100 and 98 causes the shock absorber to offer a predetermined resistance to the relative movement of the members between which it is secured. If the fluid pressure within chamber 61 is of such a degree that it cannot properly be relieved by the aforedescribed restricted fluid flow, then the excessive pressure acting from chamber 61 into the valve recess 88 against valve 90 will move said valve against the opposing effect of the spring 95 to lift the valve portion 93 from engagement with the valve seat 89 for establishing an additional restricted fluid flow through the opening presented between the valve 93 and the seat 89, thereby establishing a restriction to the transfer of fluid between chamber 61 and chamber 60 of the cylinder in accordance with the fluid pressure within the chamber 61.

If, on the other hand, the shock absorber, as shown in Fig. 2, is moved in the opposite direction by the approaching movement of the two relatively movable members between which the shock absorber is mounted, then the piston 70 and the cylinder closure member 21 are moved to approach each other, causing the piston 70 to exert a pressure upon the fluid within the upper cylinder chamber 60 in response to which the fluid flow from chamber 60 through opening 80 in the hollow rod 62, radial passage 86 into the annular space 92 provided within the recess 88 of the plug 85, the fluid then passing through opening 97, communicating orifice 98, orifice 100 through the communicating recess 88 and radial passage 87, opening 81 into the cylinder chamber 61. The restriction to the transfer of fluid from chamber 60 to 61 is the same as the restriction to the reversed flow between chamber 61 and 60 as aforedescribed and therefore the shock absorber will offer the same initial resistance to the movement of the two relatively movable members. If the pressure within chamber 60 exceeds the degree at which the orifices may completely relieve the pressure in said chamber, then valve 90 again is actuated to establish a pressure relieving flow from chamber 60 into chamber 61.

As shown in the drawing, the upper, annular end wall of space 92, provided by valve 90, is of greater area than the opposed, lower, annular end wall provided by the flange 93 on said valve. Thus this difference in opposed areas will render the fluid pressure effective to move valve 90, against the opposing effect of spring 95, so that a pressure relieving fluid flow is established past the valve seat 89 now disengaged by the valve flange 93, from chamber 60 into chamber 61. It will be noted that this single valve 90 acts to control fluid flow in both directions between said chambers. Valve 90 is moved in the same direction by excessive fluid pressure in either chamber 60 or chamber 61.

Valves 44 and 53 are replenishing valves, compensating for any fluid losses in chambers 60 or 61, respectively, caused by fluid leaks from said chambers. If there is a fluid deficiency in either chamber, the piston will, as it moves away from either valve, cause fluid to be drawn from the reservoir and into the chamber through the respective, open valve.

The orifice 103 provides for a fluid pressure escape in case temperature changes cause an expansion of fluid within the chambers 60 or 61. This prevents such pressures from opening or holding open valve 90 and consequently upsetting the immediate fluid flow control in response to shock absorber action. Thus when fluid pressures, caused by temperature responsive fluid expansion, exist, such pressures may be eliminated by escaping through the orifice 103 to the reservoir, thereby keeping valve 90 in normal seated position, ready for immediate and full fluid flow control when the shock absorber is actuated.

While the embodiment of the present invention as herein disclosed, constitutes a preferred form, it is to be understood that other forms might be adopted.

What is claimed is as follows:

1. An hydraulic shock absorber consisting of a cylinder provided with a rod guide at each end; a reciprocative piston in the cylinder forming two work chambers therein, said piston having a central tubular portion extending from opposite sides thereof, each portion being slidably supported in a rod guide, said tubular portion having an opening in the wall on each side of the piston, said side openings providing communication between the work chambers through the tubular portion of the piston; a closure member at each end of the tubular portion of the piston; and spring loaded valve mechanism in the said tubular portion, for restricting the flow of fluid between the cylinder work chambers, said valve mechanism consisting of a spring loaded valve slidable in said tubular portion and having surfaces exposed to the pressure of the fluid in both cylinder work chambers and thus being movable in one direction by fluid pressure in either work chamber for establishing and varying the restriction to fluid flow between said chambers in accordance with the fluid pressure.

2. An hydraulic shock absorber consisting of a cylinder provided with a rod guide at each end; a tubular rod slidably supported by said guides and having an imperforate, disc-like, outwardly extending flange slidably fitting the cylinder and forming a reciprocative piston therein which divides the cylinder into two working chambers; a hollow plug immovably secured within the tubular rod and having an inner, annular shoulder providing a valve seat; closure members at each end of said rod; an opening in the wall of the tubular rod adjacent each end of the piston, each opening aligning with a corresponding opening in the plug and communicating with the interior of said plug whereby the working chambers are in communication with each other through said plug; a valve slidably supported in the plug and urged toward the seat in said plug for restricting fluid flow between said cylinder chambers; and a spring interposed between said valve and a rod closure member and providing a predetermined opposing force to movements of the valve from said seat in response to fluid pressure in each cylinder working chamber.

3. An hydraulic shock absorber consisting of a cylinder provided with a rod guide at each end; a tubular rod slidably supported by said guides and having an imperforate, outwardly extending, annular flange slidably fitting the cylinder and forming a piston therein which divides the cylinder into two working chambers; closure members at the ends of the tubular rod; a plug immovably secured within the tubular rod, said plug having an axial recess extending from one end thereof in which an annular shoulder forms a valve-seat; radial passages leading from said axial recess on each side of the valve-seat to openings in the tubular rod communicating with the respective working chambers; a valve slidably supported in said axial recess for restricting fluid transfer through said plug between the working chambers in response to piston reciprocation; a spring interposed between the valve and the adjacent rod closure member, urging the valve upon the seat within the plug for predeterminately opposing movement of the valve from said seat by fluid pressure in either working chamber; and means in said adjacent closure member for adjustably securing it in said rod.

4. An hydraulic shock absorber consisting of a cylinder having a closure providing a rod guide at each end thereof; an imperforate piston dividing the cylinder into two working chambers, said piston having a hollow rod slidably supported in the rod guide; closures at each end of the hollow piston rod; immovable hollow means within the piston rod, said hollow means having side passages cooperating with openings in the piston rod for providing communication between the two working chambers; and a spring loaded valve in the said hollow means operative in one direction by fluid pressure in either working chamber for controlling fluid flow between said chambers.

5. An hydraulic shock absorber consisting of a cylinder having a closure member at each end, each closure member providing a rod guide, the one closure member having a cylindrical extension coaxial of its rod guide and closed at its end; a tube secured to both closure members and forming a fluid reservoir about said cylinder; an imperforate piston dividing the cylinder into two working chambers and having a hollow rod slidably supported in said rod guides; a solid plug secured in one end of the hollow rod and an apertured plug adjustably secured in the other end of the rod; openings in the cylindrical extension of the one closure member providing communication between the reservoir and the interior of the said cylindrical extension; a plug immovably secured within the hollow rod substantially intermediate the end plugs therein and having an axial recess from one end of the plug and short of the other end thereof and having an interior valve-seat; radial openings communicating with the axial recess and with openings in the hollow rod adjacent each side of the piston, whereby said working chambers are in communication with each other through the axial recess; and a spring loaded, orificed valve slidable in the axial recess and urged upon the valve-seat therein, said valve being operative away from said valve-seat in response to fluid pressure in either working chamber to control the fluid flow between said chambers and the reservoir in accordance with the fluid pressure in said chambers.

6. An hydraulic shock absorber consisting of a cylinder having a closure member at each end, each closure member providing a rod guide, the one closure member having a cylindrical extension coaxial of its rod guide and closed at its end; a tube secured to both closure members and forming a fluid reservoir about said cylinder; an imperforate piston dividing the cylinder into two working chambers and having a hollow rod slidably supported in said rod guides; a solid plug secured in one end of the hollow rod and an apertured plug adjustably secured in the other end of the rod; openings in the cylindrical extension of the one closure member providing communication between the reservoir and the interior of the said cylindrical extension; a plug immovably secured within the hollow rod substantially intermediate the end plugs therein and having an axial recess from one end of the plug and short of the other end thereof, said axial recess having an annular ledge forming a valve seat; radial openings in the plug communicating with the axial recess and with openings in the hollow rod adjacent each side of the piston, whereby said working chambers are in communication with each other through the axial recess in the plug; and a spring loaded orificed valve slidable in the axial recess and urged upon the valve-seat therein, said valve being orificed and thus operative, without movement, first to establish a constantly restricted fluid flow between the working chambers, then to be moved in one direction in response to increased fluid pressures in either working chamber for establishing an additional restricted fluid flow into the companion chamber, the orificed valve being operative also, without movement, to establish a pressure relieving fluid flow from said working chambers into the open cylindrical extension of the one closure member and the reservoir in response to thermal expansion of the fluid in said chambers.

7. A device in accordance with claim 5 in which each cylinder closure member has passages through which the adjacent working chamber and the fluid reservoir are connected and a spring loaded valve controlling each passage and operative to establish a replenishing fluid flow from the reservoir into the respective cylinder chambers as the closure members are moved away from the piston.

8. An hydraulic shock absorber consisting of a cylinder having a closure at each end, each closure providing a rod guide; an imperforate piston dividing the cylinder into two fluid displacement chambers, said piston having a hollow rod slidably supported in said rod guides, the one end of the rod being closed, the other end having an apertured plug adjustably secured therein and openings in the hollow rod adjacent each side of the piston; a fluid reservoir in communication with both displacement chambers and with the interior of the hollow rod through the apertured plug; a valve in each cylinder closure member, each valve being operative to permit fluid from the reservoir to enter the respective displacement chamber for replenishing fluid losses therein; a plug immovably secured in the hollow rod substantially intermediate its ends, said plug having a diametral passage adjacent each end of the piston thereon communicating with the openings in the hollow rod; an axial recess in the plug extending from one end and communicating with both diametral passages; an annular ledge forming a valve seat in the plug recess between said two passages; a hollow valve slidably fitting in the recess of the plug, a portion of the inner end being of smaller outside diameter than the body of said valve so as to form an annular shoulder on the valve and an annular space between the valve and plug with which one diametral passage communicates, there being provided an outward annular flange at the extreme end of the valve, predeterminately larger in diameter than the said smaller diameter portion of the valve and smaller than the diameter of the recess in the plug, a side opening in the smaller diameter portion of said valve; a spring interposed between the adjustable plug in the rod and said valve operative yieldably to urge the outward annular flange on the valve upon the valve seat in the recess; an opening in the wall of the smaller diameter portion of the valve; a cup-shaped plug secured within the valve, said plug having two relatively predeterminately sized orifices, one in its outer end wall, the other in its annular wall so as to communicate with the said side opening in the valve; and an orificed plug in the outer end of the valve recess.

9. A device in accordance with claim 8 in which the two orifices in the cup-shaped plug secured within the valve are substantially identical in fluid flow capacity; the orifice in the plug at the outer end of the valve recess being predeterminately smaller than said two orifices, and the annular shoulder provided between the larger and smaller outer diameter portions of the valve is of predeterminately greater area than the area of the annular flange engaging the valve seat within the valve recess.

10. An hydraulic shock absorber comprising a cylinder; a fluid reservoir in communication with each end of the cylinder through a one-way valve; an imperforate piston forming two fluid displacement chambers in the cylinder and having a hollow rod slidably supported in rod guides provided by end closure members of the cylinder; openings in the rod on each side of the piston providing communication between said displacement chambers; and fluid flow control mechanism within said hollow rod, said mechanism having a single, spring loaded, orificed valve urged into engagement with a valve seat in said hollow rod and operative first through the orifices and without moving, then movable from its seat in one direction only by fluid pressure resulting from piston reciprocation in either direction within the cylinder, for effecting predeterminately restricted transfer of fluid from one side of the piston to the other.

EDWIN F. ROSSMAN.

References Cited in the file of this patent

UNITED STATES PATENTS

| Number | Name | Date |
|---|---|---|
| 2,148,839 | Rossman et al. | Feb. 28, 1939 |
| 2,161,642 | Stroup | June 6, 1939 |
| 2,507,601 | Kehle | May 16, 1950 |

FOREIGN PATENTS

| Number | Country | Date |
|---|---|---|
| 548,943 | Great Britain | Oct. 30, 1942 |